United States Patent Office 2,733,231
Patented Jan. 31, 1956

2,733,231

METHOD OF SULFONATING INSOLUBLE AROMATIC MATERIALS

William C. Bauman and Robert M. Wheaton, Midland, Mich., assignors to The Dow Chemical Company, Midland, Mich., a corporation of Delaware No Drawing. Application May 1, 1952,
Serial No. 285,536

4 Claims. (Cl. 260—79.3)

This invention concerns an improved method for sulfonating solid aromatic materials that are insoluble in usual sulfonation mixtures and in organic liquids commonly employed as media for sulfonation reactions. It pertains especially to the sulfonation of substantially insoluble copolymers of a major amount of one or more monovinyl aromatic compounds and a minor amount of one or more polyvinyl aromatic compounds. The invention pertains more particularly to the sulfonation of rounded granules of such copolymers to obtain sulfonation throughout the individual granules.

A considerable number and variety of insoluble, copolymers of monovinyl- and polyvinyl-aromatic compounds are known. U. S. Patent No. 2,366,007 discloses that any such copolymer may be sulfonated by heating the finely-ground material together with a sulfonating agent such as concentrated sulfuric acid, fuming sulfuric acid, or chlorosulfonic acid and that, after being washed with water, the sulfonated copolymer is useful as a cation exchange agent.

U. S. Patent No. 2,500,149 teaches that ion exchange resins are advantageously employed in the form of small, and preferably rounded, granules, e. g. of from 10 to 60 Tyler screen mesh size; that the unsulfonated granules of the above-mentioned copolymers are hard, brittle and insoluble; and that the individual granules tend to undergo non-uniform sulfonation with resultant development of internal strains that cause shattering or spalling of the granules during the sulfonation reaction and the subsequent steps of conditioning the sulfonated granules for use in ion exchange processes and during employment in such processes. The patent further teaches that the granules may be sulfonated more uniformly and shattering of the same be avoided, or rendered less extensive, by first contacting the unsulfonated copolymer granules with an organic liquid, such as benzene, toluene, chlorobenzene, tetrachloroethane, tetrachloroethylene, or acetone, which is absorbed to swell the granules, draining excess liquid from the granules, and sulfonating the swollen granules, e. g. by heating the same together with concentrated sulfuric acid. The patent mentions that the organic liquids used for swelling the granules tend to become vaporized and/or sulfonated during the sulfonation reaction, but that the preliminary swelling of the granules with such liquids is, nevertheless, effective in permitting the individual granules to become sulfonated throughout.

Although the method of said Patent No. 2,500,149 is effective in obtaining sulfonation throughout the body of each individual granule, the degradation, e. g. sulfonation, oxidation, or decomposition, of the organic swelling agent which occurs during the sulfonation reaction usually results in formation of a sulfonated granular product which is of dark color and contains objectionable impurities. Such impurities can be removed by washing the product with water, but extensive washing is sometimes required for their removal. The dark color of the product may be due in part to oxidation or carbonization of the resin, as well as the organic swelling agent, under the sulfonation conditions employed in the patent.

It is an object of this invention to provide an improved method for the sulfonation of insoluble aromatic substances, particularly the aforementioned copolymers, which method involves swelling the aromatic substance by contacting it with an inorganic liquid which does not undergo sulfonation or decomposition during a sulfonation reaction and sulfonating the swollen substance. Another object is to provide such method wherein the aromatic substance is sulfonated under conditions that do not cause pronounced darkening of the same. A further object is to provide such method for the production of the sulfonated aromatic material in the form of rounded granules which are light amber to white in color, of good appearance, and which can be conditioned and used as ion exchange agents without undergoing extensive shattering or spalling of the granules. Other objects will be evident from the following description of the invention.

We have found that liquid sulfur dioxide is effective in swelling insoluble aromatic substances, e. g. the aforementioned copolymers of monovinyl and polyvinyl aromatic compounds, to an appreciable extent sufficient to facilitate sulfonation of granules, or other bodies, of such substances and that the sulfur dioxide remains inert during the sulfonation and may readily be vaporized from the product. We have further found that although any sulfonating agent, e. g. concentrated sulfuric acid, or fuming sulfuric acid, etc., can be used, in conjunction with liquid sulfur dioxide as a swelling agent, to effect sulfonation of the insoluble aromatic substances, highly reactive sulfonating agents such as chlorosulfonic acid or sulfur trioxide are advantageously used, since they are reactive at low and moderate temperatures which do not require application of high pressures to maintain the sulfur dioxide in liquid condition. Use of sulfur trioxide as the sulfonating agent is of particular advantage since any unreacted sulfur trioxide, as well as the sulfur dioxide, may be vaporized, or distilled, from the sulfonated product to obtain the latter in a form of high purity. We have also found that when using such highly reactive sulfonating agents, the liquid sulfur dioxide can advantageously be used both as a swelling agent for the aromatic materials to be sulfonated and as a diluent for the sulfonating agent to modify the reactivity of the latter.

The method is applicable in sulfonating high molecular weight aromatic substances which are insoluble in common liquid organic solvents such as benzene, toluene, xylene, carbon tetrachloride, ethylene chloride, tetrachloroethylene, ethyl alcohol, or acetone, etc., but which become swollen, at least to a slight extent, when immersed in benzene. Examples of such substances are phenolformaldehyde resins, and high molecular weight products of Friedel-Crafts reactions between olefin halides and aromatic hydrocarbons or nuclear chlorinated aromatic hydrocarbons, e. g. between ethylene chloride and benzene or chlorobenzene, etc. However, the invention pertains especially to the sulfonation of the benzene-insoluble copolymers of a major amount by weight of one or more monoalkenyl aromatic compounds having the general formula:

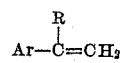

$$\mathrm{Ar}-\overset{R}{\underset{|}{C}}=CH_2$$

wherein Ar represents a monovalent aromatic radical of the benzene series and R is hydrogen or a methyl group, and a minor amount of one or more polyvinyl aromatic compounds. Examples of copolymers of monoalkenyl aromatic compounds and polyvinyl aromatic compounds which may be employed in practice of the invention are the copolymers of a minor amount of one or more of the isomeric divinylbenzenes with a major amount of one or more of the compounds styrene, ar-vinyltoluene, ar-vinylxylene, ar-chlorostyrene, alpha-methtylstyrene or alpha-methyl-para-methylstyrene, etc. In place of divinylbenzene, ar-methyldivinylbenzene, ar-ethyldivinylbenzene, or mixtures of these compounds with one another or with divinylbenzene, may be employed. The copolymers usually contain from 0.5 to 20, preferably from 3 to 11, per cent by weight of the chemically combined polyvinyl aromatic compound, but the latter may be present in smaller or larger proportions.

The high molecular weight aromatic substances, e. g. copolymers, just mentioned absorb, and become swollen to an appreciable extent by, liquid sulfur dioxide when immersed in the latter. In some instances, the swelling is slight and barely perceptible, but it is sufficient to permit penetration of a sulfonating agent into the aromatic substance under treatment and to facilitate sulfonation throughout a granule, or other body, of such substance.

In order to facilitate sulfonation throughout a granule of one of the copolymers, the liquid sulfur dioxide need be employed only in amount sufficient to be absorbed by, and cause slight swelling of, the granule. However, it is difficult to employ liquid sulfur dioxide in such small proportion and, at the same time, assure even distribution of the same throughout a body of granular material to be sulfonated. Also, the chlorosulfonic acid and sulfur trioxide which are preferably employed as sulfonating agents are highly reactive and may advantageously be diluted with the liquid sulfur dioxide so as to reduce the vigor of the reaction and permit rapid withdrawal of heat generated by the reaction so as to control the temperature. For both of these reasons, the liquid sulfur dioxide is advantageously used in amount sufficient to thoroughly wet the material to be sulfonated and leave unabsorbed liquid sulfur dioxide in contact with the material. Usually, the granular copolymer is immersed in liquid sulfur dioxide to form a suspension or slurry of the granules. In most instances, the sulfur dioxide is in amount corresponding to half or more of the weight of the sulfonating agent. It may be present in as large a proportion as desired.

The granular material and sulfur dioxide are admixed under conditions of temperature and pressure such that the sulfur dioxide is liquid. The mixing may be accomplished under pressure in a closed container at room temperature or thereabout, or at lower temperatures and atmospheric pressure. A portion of the liquid sulfur dioxide is absorbed by the copolymer granules to swell the latter. Usually, the mixture is permitted to stand for 5 minutes or more, e. g. from 5 to 60 minutes and preferably a half hour or longer, before adding the sulfonating agent, but this is not necessary. In some instances, the sulfonating agent, e. g. sulfur trioxide, may be added within a few minutes after, or even together with, the sulfur dioxide. For example, the sulfur dioxide and sulfur trioxide or chlorosulfonic acid may be added simultaneously to the granular material at low temperatures, e. g. —30° C. or lower, and the mixture be warmed to a temperature at which the sulfonation occurs fairly rapidly.

The sulfonating agent is preferably added gradually, with stirring, to the mixture of granular copolymer and liquid sulfur dioxide so as to avoid an excessive temperature rise due to the heat of reaction. However, it may all be added initially and the mixture be strongly cooled. The sulfonating agent is usually employed in amount corresponding to that theoretically required for introduction of an average of from 0.5 to 1.5 sulfonic acid radicals per aromatic nucleus in the copolymer under treatment, but it can be used in smaller or larger proportions. The chlorosulfonic acid and sulfur trioxide which are preferably used as sulfonating agents are reactive, even at temperatures far below 0° C. The sulfonation is usually carried out at temperatures between —60° C. and +40° C., but higher temperatures can be used, particularly in the final stages of the reaction. In practice, the reaction is usually started at —10° C. or lower and the temperature is permitted to rise during the reaction. The reaction occurs fairly rapidly at temperatures of —30° C. and above when using sulfur trioxide or chlorosulfonic acid as reactants. The sulfonation can be started and carried to completion under pressure at room temperature or thereabout, e. g. at temperatures of from 15° to 30° C.

After completing the sulfonation reaction, the sulfur dioxide may be removed in usual ways, e. g. by decanting, filtering, vaporizing or distilling, to obtain the granular copolymer sulfonic acid as residue. The granules are conditioned for employment as a cation exchange material in known manner, e. g. by gradual treatment with an equal weight or more of water which may be applied as a spray, and thereafter washing the granules with water.

The granular copolymer sulfonic acid product is usually of light color, e. g. white or amber, and is substantially free of objectionable impurities.

The following examples describe ways in which the invention has been practiced, but are not to be construed as limiting its scope.

*Example 1*

Fifty grams of a benzene-insoluble copolymer of about 83.8 per cent by weight styrene, 7.2 per cent ar-ethylvinylbenzene, and 9 per cent divinylbenzene, which copolymer was in the form of small rounded granules of from 20 to 60 Tyler screen mesh size, was immersed in liquid sulfur dioxide which was cooled to —55° C. and was in amount sufficient to cover the granules. The mixture was permitted to stand for from 30 to 60 minutes, during which time the granules absorbed liquid sulfur dioxide and swelled to an extent estimated as being from 1 to 2 per cent of their original volume. Seventy-five grams of chlorosulfonic acid was added gradually, with stirring, over a period of 75 minutes, while cooling the mixture sufficiently to maintain the sulfur dioxide in liquid condition. The mixture was then permitted to warm to about —10° C. so as to vaporize the sulfur dioxide therefrom. It was evident that a reaction occurred during addition of the chlorosulfonic acid or during the subsequent warming of the mixture. The residual granular material was stirred and sprayed with a liquid mist of water, while stirring the same, until a considerable amount, e. g. about half, of the granules were immersed in the resulting aqueous liquid. The material was next washed with water. It was then in the form of rounded granules, of light amber color, having a volume of 160 cc. A measured volume of the granules was immersed in an aqueous sodium chloride solution, containing more sodium chloride than could possibly react with the granules, and the mixture was titrated with a standard aqueous sodium hydroxide solution to determine the ion exchange capacity. The ion exchange capacity corresponded to 1.59 gram mole of sodium hydroxide per liter of the granular material. The sulfonated copolymer was insoluble in water, and in aqueous solutions of acids and alkalies.

*Example 2*

The procedure of Example 1 was repeated, except that 48 grams of liquid sulfur trioxide, instead of 100 grams of chlorosulfonic acid, was used as the sulfonating agent and the sulfur trioxide was added dropwise while maintaining the reaction mixture at temperatures between —52° and —60° C., after which the mixture was permitted to warm to about 0° C., whereby the sulfur dioxide was vaporized and removed. The sulfonated copolymer product was in the form of rounded granules and was of light amber color. It had an ion exchange capacity corresponding to 0.946 gram mole of sodium hydroxide per liter of the granular product.

Example 3

In each of three experiments 2.67 grams of a copolymer of 84.5 per cent by weight styrene, 6.9 per cent ar-ethylvinylbenzene, and 8.6 per cent divinylbenzene (which copolymer was in the form of rounded beads of from 20 to 60 mesh size), 7 grams of liquid sulfur dioxide and the weight of sulfur trioxide indicated in the following table were charged into a glass bomb. Each bomb was cooled to about −60° C. during loading, then closed, and permitted to warm to room temperature. Each mixture was agitated in a bomb overnight, i. e. for about 16 hours. Throughout most of this period each mixture was at a temperature of about 30° C., but it is believed that slightly higher temperatures, e. g. 35–40° C., may have been attained for a short time during the earlier and more vigorous stages of the reaction. Each bomb was then opened and the sulfur dioxide and any unreacted sulfur trioxide removed by vaporization. Each residual sulfonated copolymer product was in the form of rounded beads of light amber color. In two of the experiments a small portion, e. g. from 1 to 3 per cent, of the beads had become cracked during the sulfonation reaction, but in the third experiment none of the beads were found to have cracked. Each sulfonated copolymer product was treated, and washed, with water and tested to determine its ion exchange capacity. The table gives the weight, in grams, of sulfur trioxide employed as a sulfonating agent in each experiment, indicates the extent to which the copolymer beads became cracked during the sulfonation reaction, and gives the ion exchange capacity (expressed as grains of calcium carbonate per cubic foot of the wet granular sodium salt of the sulfonated copolymer) of the sulfonated copolymer obtained in each experiment.

| Run No. | Gms. of $SO_3$ | Extent of Bead Cracking | Ion Exchange Capacity, grs. $CaCO_3$/cu. ft. |
|---|---|---|---|
| 1 | 1.56 | slight | 36,900 |
| 2 | 2.1 | do | 39,200 |
| 3 | 2.6 | none | 37,000 |

We claim:

1. A method which comprises swelling a solid, benzene-swellable copolymer of a major proportion by weight of at least one alkenyl aromatic compound having the general formula:

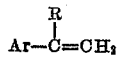

wherein Ar represents a monovalent aromatic radical of the benzene series and R is a member of the group consisting of hydrogen and the methyl radical, and a minor proportion of at least one polyvinyl aromatic compound of the benzene series, by immersing the copolymer in liquid sulfur dioxide for from 5 to 60 minutes and thereafter reacting the swollen sulfonated copolymer with a sulfonating agent of the group consisting of sulfur trioxide and chlorosulfonic acid at reaction temperatures between −60° and 40° C.

2. A method, as claimed in claim 1, wherein the copolymer is a copolymer of styrene, ethylvinylbenzene, and divinylbenzene and contains from 0.5 to 20 per cent by weight of chemically combined divinylbenzene, and is in granular form.

3. A method, as claimed in claim 1, wherein the copolymer is a copolymer of styrene, ethylvinylbenzene and from 3 to 11 per cent by weight of divinylbenzene, and is in the form of rounded granules, the sulfonating agent is sulfur trioxide, and the sulfur trioxide is added to a mixture of the sulfur dioxide-swollen granules and liquid sulfur dioxide at temperatures below 40° C. and is reacted with the copolymer granules in the presence of liquid sulfur dioxide at temperatures between −30° and 40° C.

4. A method which comprises swelling a solid, benzene-swellable copolymer of a major proportion by weight of at least one alkenyl aromatic compound having the general formula:

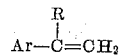

wherein Ar represents a monovalent aromatic radical of the benzene series and R is a member of the group consisting of hydrogen and the methyl radical, and a minor proportion of at least one polyvinyl aromatic compound of the benzene series, by immersing the copolymer in liquid sulfur dioxide for from 5 to 60 minutes and thereafter reacting the swollen copolymer with a sulfonating agent.

References Cited in the file of this patent

UNITED STATES PATENTS

| | | |
|---|---|---|
| 2,445,569 | Fox | July 20, 1948 |
| 2,500,149 | Boyer | Mar. 14, 1950 |
| 2,645,621 | D'Alelio | July 14, 1953 |